(12) United States Patent
Lin et al.

(10) Patent No.: US 12,017,657 B2
(45) Date of Patent: Jun. 25, 2024

(54) VEHICLE OCCUPANT CLASSIFICATION USING RADAR POINT CLOUD

(71) Applicant: Ford Global Technologies, LLC, Dearborn, MI (US)

(72) Inventors: Jun Lin, Westland, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 17/570,640

(22) Filed: Jan. 7, 2022

(65) Prior Publication Data
US 2023/0219578 A1  Jul. 13, 2023

(51) Int. Cl.
*G06V 20/59* (2022.01)
*B60W 40/08* (2012.01)

(52) U.S. Cl.
CPC ........... *B60W 40/08* (2013.01); *G06V 20/593* (2022.01); *B60W 2040/0881* (2013.01); *B60W 2420/408* (2024.01)

(58) Field of Classification Search
CPC ......... B60W 40/08; B60W 2040/0881; B60W 2420/52; B60W 2540/221; G06V 20/593; G06V 40/103; G01S 13/88; G01S 13/882
See application file for complete search history.

(56) References Cited

U.S. PATENT DOCUMENTS

| 9,098,655 | B2 * | 8/2015 | Plummer | G06T 15/08 |
| 11,628,855 | B1 * | 4/2023 | Pradhan | G01S 17/58 |
| | | | | 701/24 |
| 2014/0123507 | A1 * | 5/2014 | Gupta | G06T 7/70 |
| | | | | 33/1 M |
| 2018/0251122 | A1 * | 9/2018 | Golston | B60W 40/08 |
| 2019/0180467 | A1 * | 6/2019 | Li | G01S 17/93 |
| 2020/0320841 | A1 | 10/2020 | Sim | |
| 2020/0357190 | A1 * | 11/2020 | Reid | G06T 19/20 |
| 2020/0389639 | A1 * | 12/2020 | Rhyu | G06T 3/00 |
| 2020/0394813 | A1 * | 12/2020 | Theverapperuma | G06F 18/2431 |
| 2021/0041554 | A1 | 2/2021 | Ramesh et al. | |
| 2021/0063578 | A1 * | 3/2021 | Wekel | G01S 7/481 |
| 2021/0072041 | A1 * | 3/2021 | Castorena Martinez | G06V 20/64 |
| 2021/0179117 | A1 * | 6/2021 | Glazman | B60H 1/00357 |

(Continued)

FOREIGN PATENT DOCUMENTS

| CN | 112488210 A | * | 3/2021 | G06K 9/6256 |
| CN | 113050083 A | * | 6/2021 | |

(Continued)

OTHER PUBLICATIONS

Deng, Thesis "Vehicle Occupant Monitoring with mmWave Wideband Planar Array Radar", Purdue University, School of Electrical and Computer Engineering, May 2021.

*Primary Examiner* — B M M Hannan
(74) *Attorney, Agent, or Firm* — Frank Lollo; Bejin Bieneman PLC

(57) ABSTRACT

A system comprises a computer having a processor and a memory, the memory storing instructions executable by the processor to access sensor data from one or more imaging radar sensors of a vehicle, identify, based on the sensor data, a radar point cloud corresponding to an occupant of the vehicle, analyze the radar point cloud to determine an occupant classification of the occupant, determine an operating parameter for a feature of the vehicle based on the occupant classification, and implement the operating parameter for the feature.

20 Claims, 7 Drawing Sheets

(56) References Cited

U.S. PATENT DOCUMENTS

| | | | |
|---|---|---|---|
| 2021/0241026 A1* | 8/2021 | Deng | G01S 7/417 |
| 2022/0108528 A1* | 4/2022 | Feng | G06T 7/74 |
| 2022/0198205 A1* | 6/2022 | Raj | G06V 20/59 |
| 2022/0203884 A1* | 6/2022 | Cech | G08B 21/22 |
| 2022/0203917 A1* | 6/2022 | Lisseman | G06V 40/10 |
| 2022/0292705 A1* | 9/2022 | Friedman | G06V 10/82 |
| 2022/0388465 A1* | 12/2022 | Roberts | G01S 7/412 |
| 2022/0388525 A1* | 12/2022 | Roberts | B60W 50/14 |
| 2023/0030426 A1* | 2/2023 | Glazman | B60R 21/015 |
| 2023/0138431 A1* | 5/2023 | Kuno | G06V 20/597 |
| | | | 340/426.34 |
| 2023/0168364 A1* | 6/2023 | Podkamien | G01S 13/89 |
| | | | 701/45 |
| 2023/0360508 A1* | 11/2023 | Mcanena | G08B 21/0461 |

FOREIGN PATENT DOCUMENTS

| | | | | | |
|---|---|---|---|---|---|
| CN | 113176585 | A | * | 7/2021 | |
| CN | 113885062 | A | * | 1/2022 | |
| CN | 113945913 | A | * | 1/2022 | |
| CN | 114639115 | A | * | 3/2022 | |
| DE | 102016219517 | B4 | | 6/2019 | |
| DE | 112020006426 | T5 | * | 12/2022 | B60W 10/04 |
| EP | 4148657 | A1 | * | 3/2023 | G06T 3/0018 |
| FR | 3095859 | A1 | | 11/2020 | |
| JP | 6782283 | B2 | * | 11/2020 | B60Q 9/00 |
| JP | 2021160707 | A | * | 10/2021 | B60W 40/08 |
| JP | 2022008054 | A | * | 1/2022 | |
| JP | 2022175096 | A | * | 11/2022 | |
| WO | WO-2019111244 | A1 | * | 6/2019 | B60H 1/00357 |
| WO | WO-2022064182 | A1 | * | 3/2022 | G08B 21/043 |

\* cited by examiner

VEHICLE OCCUPANT CLASSIFICATION USING RADAR POINT CLOUD

BACKGROUND

In a vehicle such as an automobile, various systems may include features that can be enabled or disabled. For example, it may be possible to enable or disable a passive restraint system in the vehicle. It may also be possible to configure or modify the operations of some features. For instance, it may be possible to impose a volume limit on the audio output of an in-vehicle entertainment system.

DETAILED DESCRIPTION

Figure 1:
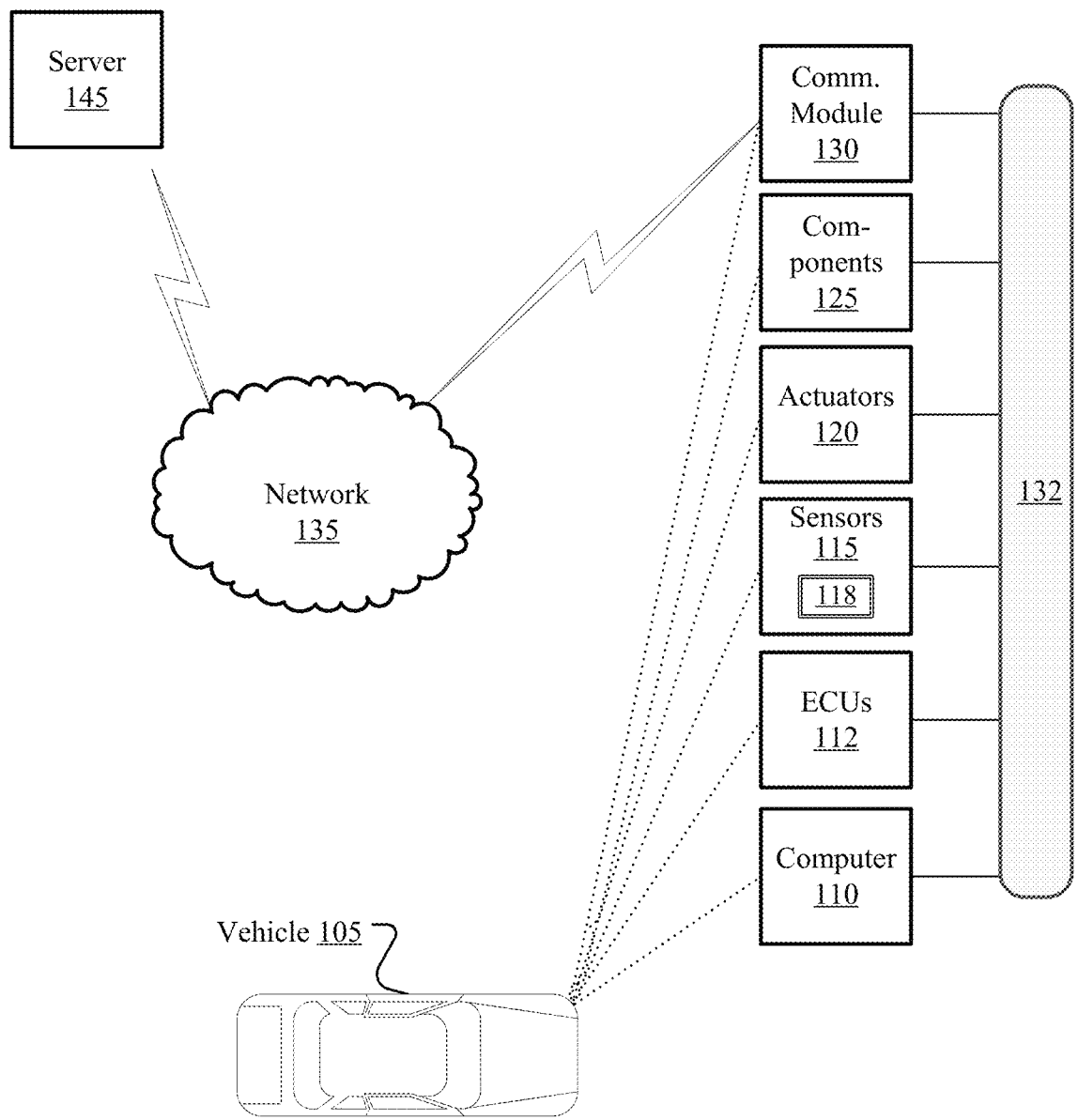
FIG. 1 is a block diagram of an example system.

Disclosed herein are vehicle occupant classification improvements according to which occupants of a vehicle can be classified based on radar point cloud data. The vehicle can be equipped with radar sensors that can perform radar scans of interior regions of the vehicle. Using sensor data generated via such radar scans, radar point clouds can be identified that correspond to vehicle occupants in the scanned regions. Based on characteristics of the radar point clouds, determinations can be made regarding characteristics of the corresponding occupants. For instance, based on characteristics of a radar point cloud, a particular occupant can be classified as being of a particular class among a plurality of occupant classes. Operating parameters for vehicle features can then be determined and implemented based on characteristics/classifications of vehicle occupants.

A system can comprise a computer having a processor and a memory, the memory storing instructions executable by the processor to access sensor data from one or more imaging radar sensors of a vehicle, identify, based on the sensor data, a radar point cloud corresponding to an occupant of the vehicle, analyze the radar point cloud to determine an occupant classification of the occupant, determine an operating parameter for a feature of the vehicle based on the occupant classification, and implement the operating parameter for the feature.

The memory can store instructions executable by the processor to determine a height of the radar point cloud and determine the occupant classification of the occupant based on the height of the radar point cloud.

The memory can store instructions executable by the processor to determine measurements of the radar point cloud in multiple dimensions and determine the occupant classification of the occupant based on the measurements of the radar point cloud in the multiple dimensions.

The memory can store instructions executable by the processor to determine a number of points in the radar point cloud and determine the occupant classification of the occupant based on the number of points in the radar point cloud.

The memory can store instructions executable by the processor to determine coordinates of a center of the radar point cloud according to a reference coordinate system and determine the occupant classification of the occupant based on the coordinates of the center of the radar point cloud.

The memory can store instructions executable by the processor to determine the occupant classification of the occupant based on two or more of a height of the radar point cloud, measurements of the radar point cloud in multiple dimensions, a number of points in the radar point cloud, or coordinates of a center of the radar point cloud according to a reference coordinate system.

Determining the occupant classification of the occupant can include identifying a class of the occupant from among a plurality of classes.

The plurality of classes can include multiple classes corresponding to different respective percentile ranges of human size.

The plurality of classes can include at least one child class.

The plurality of classes can include at least one pet class.

A method can comprise accessing sensor data from one or more imaging radar sensors of a vehicle, identifying, based on the sensor data, a radar point cloud corresponding to an occupant of the vehicle, analyzing the radar point cloud to determine an occupant classification of the occupant, determining an operating parameter for a feature of the vehicle based on the occupant classification, and implementing the operating parameter for the feature.

The method can comprise determining a height of the radar point cloud and determining the occupant classification of the occupant based on the height of the radar point cloud.

The method can comprise determining measurements of the radar point cloud in multiple dimensions and determining the occupant classification of the occupant based on the measurements of the radar point cloud in the multiple dimensions.

The method can comprise determining a number of points in the radar point cloud and determining the occupant classification of the occupant based on the number of points in the radar point cloud.

The method can comprise determining coordinates of a center of the radar point cloud according to a reference coordinate system and determining the occupant classification of the occupant based on the coordinates of the center of the radar point cloud.

The method can comprise determining the occupant classification of the occupant based on two or more of a height of the radar point cloud, measurements of the radar point cloud in multiple dimensions, a number of points in the radar point cloud, or coordinates of a center of the radar point cloud according to a reference coordinate system.

Determining the occupant classification of the occupant can include identifying a class of the occupant from among a plurality of classes.

The plurality of classes can include multiple classes corresponding to different respective percentile ranges of human size.

The plurality of classes can include at least one child class.

The plurality of classes can include at least one pet class.

FIG. 1 is a block diagram of an example vehicle system 100. The system 100 includes a vehicle 105, e.g., a car, truck, etc. The vehicle 105 includes a computer 110, electronic control units (ECUs) 112, vehicle sensors 115, actuators 120 to actuate various vehicle components 125, a communications module 130, and a vehicle network 132.

Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above. The computer 110 could, but need not, be an ECU.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2I) wireless communications to another vehicle, to (typically via the network 135) a remote server 145 (V2V and V2I may be collectively referred to as V2X). The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) and cellular V2V (CV2V), cellular V2I or V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
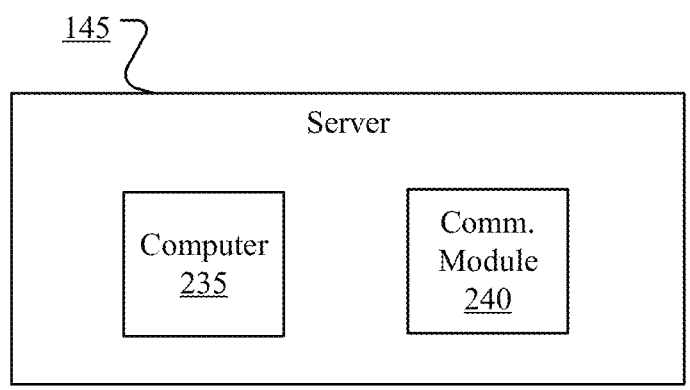
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links.

Returning to FIG. 1, sensors 115 can include one or more imaging radar sensors 118 arranged for scanning interior regions of vehicle 105 (i.e., spaces inside a vehicle 105 passenger cabin or compartment). Imaging radar sensors 118 can direct radar signals toward interior regions of vehicle 105, and can generate sensor data based on returns of the radar signals. Computer 110 can receive the sensor data and can identify radar point clouds that correspond to occupants of vehicle 105. Computer 110 can then determine characteristics of the vehicle occupants based on characteristics of the corresponding radar point clouds.

Based on characteristics of occupants of vehicle 105, computer 110 can selectively enable/disable and/or modify operations of features of vehicle 105. Such characteristics can include occupant size, weight, position within the vehicle, age group (e.g., child or adult), and other characteristics that can be determined/inferred based on characteristics of the corresponding radar point clouds. For instance, if any occupant of the vehicle is a child (based on analysis of the identified radar point clouds), computer 110 can impose a volume limit on the audio output of an in-vehicle entertainment system. In another example, computer 110 can disable a passive restraint system at a particular seat based on a determination (based on characteristics of a radar point cloud) that a passenger occupying the seat is below a threshold size.

Figure 3:
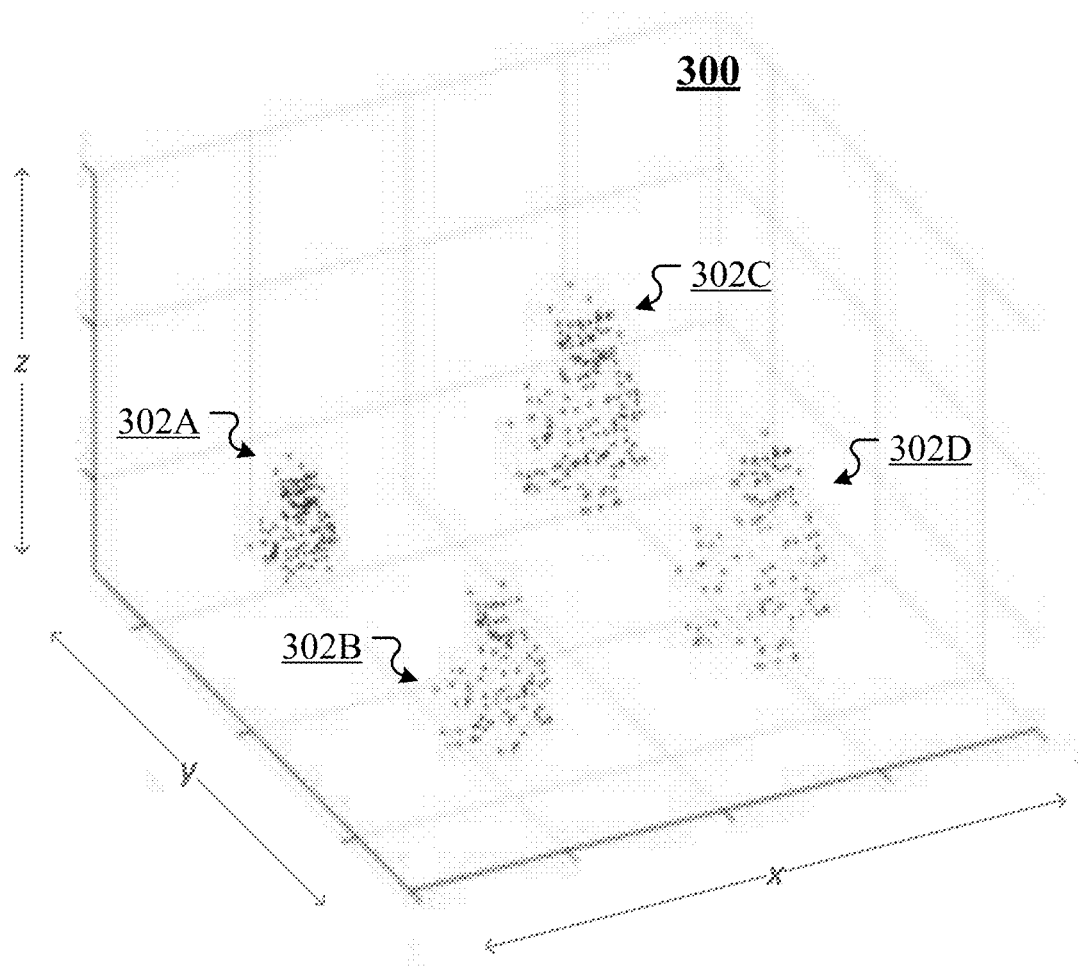
FIG. 3 illustrates first, second, third, and fourth example radar point clouds.

FIG. 3 illustrates example radar point clouds 302A, 302B, 302C, and 302D in a three-dimensional space 300 corresponding to an interior region of a vehicle (e.g., vehicle 105). As shown in FIG. 3, the positions of points in radar point clouds 302A, 302B, 302C, and 302D within three-dimensional space 300 can be understood in terms of a reference coordinate system featuring x, y, and z dimensions. The x dimension can be regarded as a "width" dimension, the y dimension can be regarded as a "depth" dimension, and the z dimension can be regarded as a "height" dimension.

In some implementations, computer 110 can classify occupants of vehicle 105 according to an occupant classification scheme that associates particular radar point cloud characteristics with particular occupant characteristics. In some implementations, the occupant classification scheme can define a plurality of occupant classes and a system/scheme for mapping occupants to occupant classes based on characteristics of the occupants' corresponding radar point clouds. In an example, an occupant classification scheme can define a plurality of occupant classes consisting of a child class, a small adult class, a medium adult class, and a large adult class, and can specify a system/scheme for mapping occupants to those classes based on dimensions of the occupants' corresponding radar point clouds.

In some implementations, computer 110 can apply an occupant classification scheme that maps occupants to occupant classes based on one-dimensional measurements of the occupants' radar point clouds. For instance, in some implementations, occupants can be mapped to occupant classes based on the heights of the occupants' radar point clouds. In some implementations, as illustrated in FIG. 4, the heights of those radar point clouds can be determined as the respective positions of the extreme points of the radar point clouds in a vertical dimension (e.g., the z dimension).

Figure 4:
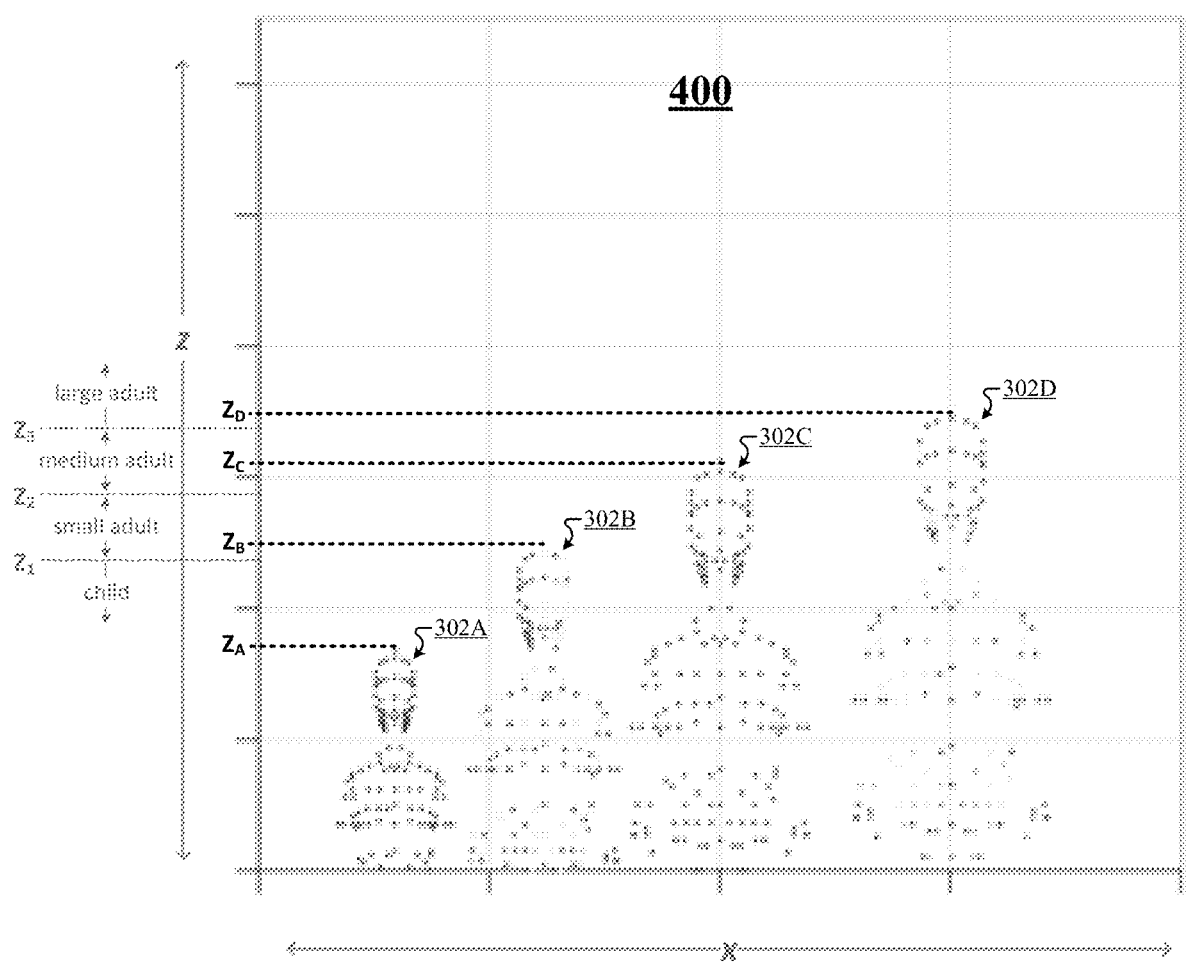
FIG. 4 illustrates further aspects of the first, second, third, and fourth example radar point clouds.

FIG. 4 shows a two-dimensional view 400 of radar point clouds 302A, 302B, 302C, and 302D in the x-z plane (i.e., a vertical plane). In the z dimension, the positions of the extreme points of radar point clouds 302A, 302B, 302C, and 302D are points $Z_A$, $Z_B$, $Z_C$, and $Z_D$, respectively. According to an example occupant classification scheme, occupants corresponding to radar point clouds 302A, 302B, 302C, and 302D can be respectively mapped to one of four occupant classes based on their respective heights, as defined by the positions of points $Z_A$, $Z_B$, $Z_C$, and $Z_D$.

In the depicted example, the four occupant classes include "child," "small adult," "medium adult," and "large adult" classes. Occupants whose radar point clouds are of heights less than $Z_1$ are mapped to the "child" class. Occupants whose radar point clouds are of heights between $Z_1$ and $Z_2$ are mapped to the "small adult" class. Occupants whose radar point clouds are of heights between $Z_2$ and $Z_3$ are mapped to the "medium adult" class. Occupants whose radar point clouds are of heights greater than $Z_3$ are mapped to the "large adult" class.

The height $Z_A$ of radar point cloud 302A is less than $Z_1$, and the occupant corresponding to radar point cloud 302A will thus be mapped to the "child" class. The height $Z_B$ of radar point cloud 302B is greater than $Z_1$ but less than $Z_2$, and the occupant corresponding to radar point cloud 302B will thus be mapped to the "small adult" class. The height $Z_C$ of radar point cloud 302C is greater than $Z_2$ but less than $Z_3$, and the occupant corresponding to radar point cloud 302C will thus be mapped to the "medium adult" class. The height $Z_D$ of radar point cloud 302D is greater than $Z_3$, and the occupant corresponding to radar point cloud 302D will thus be mapped to the "large adult" class.

Figure 5:
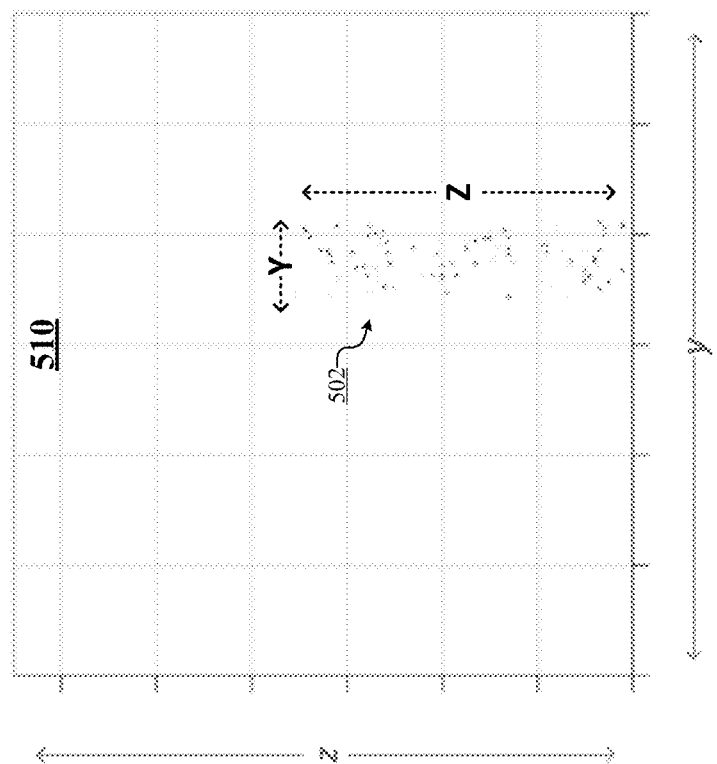
FIG. 5 illustrates a fifth example radar point cloud.
Figure 5:
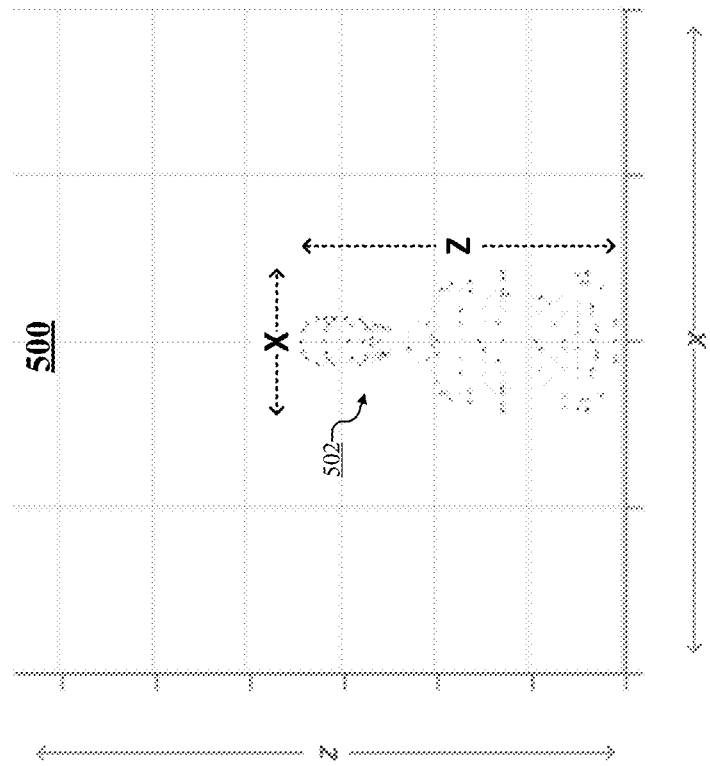

In some implementations, computer 110 can apply an occupant classification scheme that maps occupants to occupant classes based on measurements of the occupants' respective radar point clouds in multiple dimensions. FIG. 5 illustrates measurements of a radar point cloud 502 based on which a corresponding occupant may be mapped to an occupant class according to some implementations. FIG. 5 includes a two-dimensional view 500 of a radar point cloud 502 in the x-z plane, and a two-dimensional view 510 of the radar point cloud 502 in the y-z plane (i.e., a vertical plane that intersects the x-z plane, typically at a right angle). Two-dimensional view 500 illustrates that radar point cloud 502 has a width X in the x dimension and a height Z in the z dimension. Two-dimensional view 510 illustrates that radar point cloud 502 has a depth Y in the y dimension, and also illustrates that radar point cloud has the height Z in the z dimension.

In some implementations, according to the occupant classification scheme, measurements of a radar point cloud in multiple dimensions can be inputs to a multi-variable equation for a decision parameter used in occupant class mapping. For example, in some implementations, a decision parameter k can be determined for radar point cloud 502 based on width X, depth Y, and height Z, according to Equation (1) as follows:

$$k = aX^b + cY^d + eZ^f \quad (1)$$

where a, b, c, d, e, and f are weighting parameters that may be determined via training based on empirical data. In some implementations, an occupant corresponding to radar point cloud 502 can be mapped to an occupant class based on a comparison of the value of decision parameter k with one or more threshold values. For instance, if k is less than a value $K_1$, the occupant may be mapped to a "child" class. If k is greater than $K_1$ but less than a value $K_2$, the occupant may be mapped to a "small adult" class. If k is greater than $K_2$ but less than a value $K_3$, the occupant may be mapped to a "medium adult" class. If k is greater than $K_3$, the occupant may be mapped to a "large adult" class.

In some implementations, computer 110 can apply an occupant classification scheme that maps occupants to occupant classes based on numbers of points comprised in the occupants' radar point clouds. As larger occupants can tend to produce radar point clouds including larger numbers of points, radar point clouds including larger numbers of points can generally be mapped to occupant classes associated with larger persons. In some implementations, all points in a radar point cloud can be included in determining a total number of points. In other implementations, a number of points in a radar point cloud can be determined based on a view of the radar point cloud in the context of less than three dimensions. For example, a number of points in radar point cloud 502 could be determined as a number of points present along the vertical span of radar point cloud 502 in the z dimension, or a number of points present in a cross-section of radar point cloud 502 in the x-z plane, y-z plane, or x-y plane (i.e., a horizontal plane).

In some implementations, computer 110 can apply an occupant classification scheme that maps occupants to occupant classes based on the coordinates of the respective central points of the occupants' radar point clouds. In some implementations, in order to identify a central point of a radar point cloud, computer 110 can identify central planes of the radar point cloud in the x, y, and z dimensions. With respect to each dimension, a plane including the largest number of points can be identified as the central plane. For example, an x-y plane corresponding to z=M can be identified as the central plane in the z dimension, where M represents the z coordinate of the x-y plane containing the largest number of points.

A point of intersection of the central planes in the x, y, and z, dimensions can be identified as the central point of the radar point cloud. Based on the coordinates of the central point and calculations based on the Pythagorean theorem, distances between the central point and reference points/planes can be determined, and an occupant associated with the radar point cloud can be classified according to those distances. For example, computer 110 can identify a central point of radar point cloud 502, determine distances from the central point to a seatback plane and a floor, and classify an occupant associated with radar point cloud 502 based on those distances.

In some implementations, computer 110 can apply an occupant classification scheme that employs a combination of more than one of the aforementioned approaches. For example, in some implementations, computer 110 can apply an occupant classification scheme that maps occupants to occupant classes based on two or more of heights of the radar point clouds for respective occupants, measurements of the occupants' radar point clouds in multiple dimensions, numbers of points in the occupants' radar point clouds, and coordinates of central points of the respective radar point clouds.

In some implementations, computer 110 can apply an occupant classification scheme that defines a plurality of occupant classes including one or more non-human occupant classes. For instance, in some implementations, the plurality of occupant classes can include a pet class, or can include multiple pet classes associated with pets of different characteristics (e.g., a "small dog" class and a "large dog" class).

Figure 6:
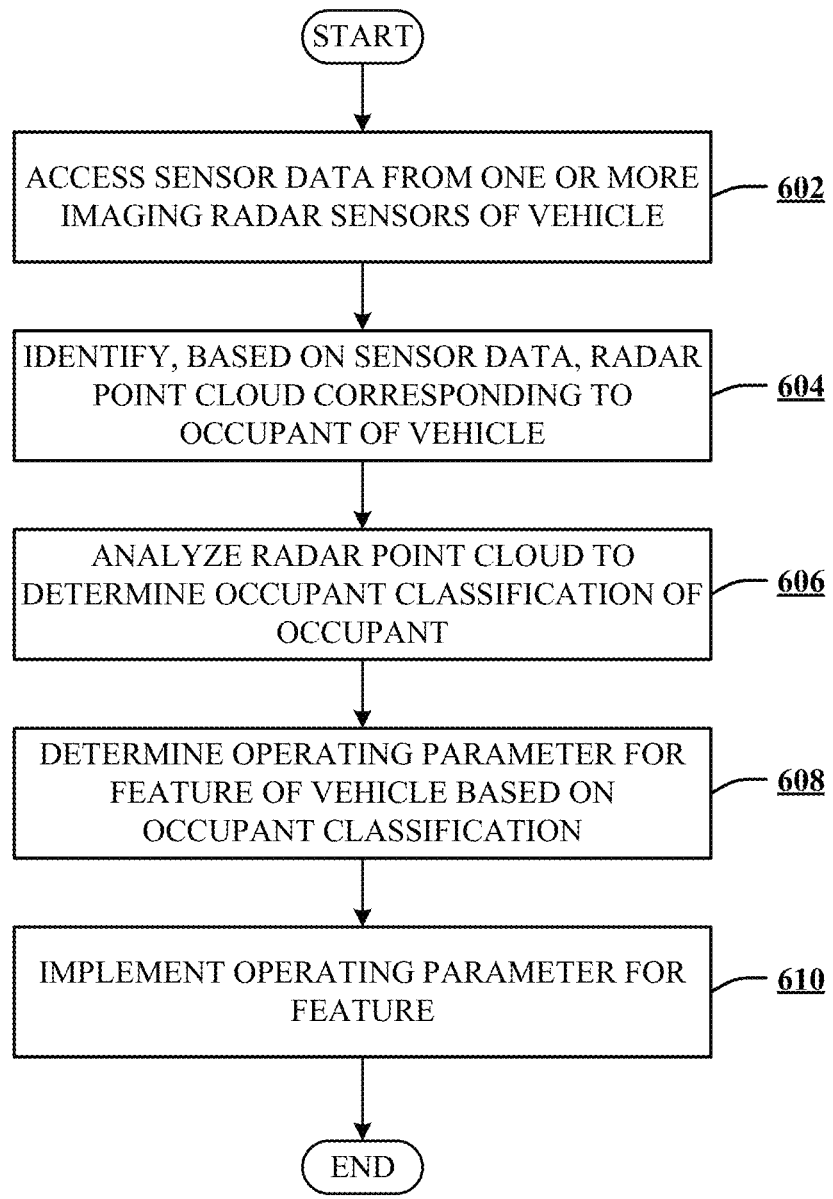
FIG. 6 is a block diagram of an example process flow.

FIG. 6 is a block diagram of a process flow 600, which illustrates operations that can be executed in example implementations. For example, process flow 600 can be executed by computer 110 of vehicle 105. As shown in FIG. 6, sensor data from one or more imaging radar sensors of a vehicle can be accessed at 602. For example, computer 110 can access sensor data from one or more imaging radar sensors 118. At 604, a radar point cloud corresponding to an occupant of the vehicle can be identified based on the sensor data. For example, computer 110 can identify one of radar point clouds 302A, 302B, 302C, 302D, and 502 based on sensor data from one or more imaging radar sensors 118.

At 606, the radar point cloud can be analyzed to determine an occupant classification of the occupant. For example, computer 110 can analyze a radar point cloud identified at 604 to determine an occupant classification of an occupant corresponding to the radar point cloud. At 608, an operating parameter for a feature of the vehicle can be determined based on the occupant classification. For example, computer 110 can determine an operating parameter for a feature of vehicle 105 based on an occupant classification determined at 606. At 610, the operating parameter can be implemented for the feature. For example, having determined an operating parameter for a feature of vehicle 105 at 608, computer 110 can implement that operating parameter for that feature at 610. Following 610, the process flow 600 can end.

Figure 7:
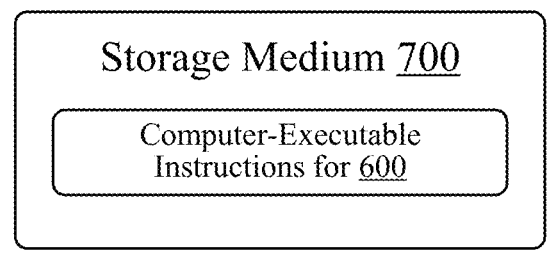
FIG. 7 is a block diagram of an example storage medium.

FIG. 7 illustrates an example storage medium 700. Storage medium 700 may be any non-transitory computer-readable storage medium or machine-readable storage medium, such as an optical, magnetic or semiconductor storage medium. In various implementations, storage medium 700 may be an article of manufacture. In some implementations, storage medium 700 may store computer-executable instructions, such as computer-executable instructions to implement process flow 600. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
a computer having a processor and a memory, the memory storing instructions executable by the processor to:
access sensor data from one or more imaging radar sensors of a vehicle;
identify, based on the sensor data, a radar point cloud corresponding to an occupant of the vehicle;
analyze the radar point cloud to determine an occupant classification of the occupant, including determining coordinates of a center of the radar point cloud according to a reference coordinate system, and determining the occupant classification of the occupant based on the coordinates of the center of the radar point cloud;
determine to disable a passive restraint system in the vehicle based on the occupant classification determined by analyzing the radar point cloud; and
disable the passive restraint system.

2. The system of claim 1, the memory storing instructions executable by the processor to:
determine a height of the radar point cloud; and
determine the occupant classification of the occupant further based on the height of the radar point cloud.

3. The system of claim 1, the memory storing instructions executable by the processor to:
determine measurements of the radar point cloud in multiple dimensions; and
determine the occupant classification of the occupant further based on the measurements of the radar point cloud in the multiple dimensions.

4. The system of claim 1, the memory storing instructions executable by the processor to determine the occupant classification of the occupant based on the coordinates of the center of the radar point cloud according to the reference coordinate system and one or more of:
a height of the radar point cloud;
measurements of the radar point cloud in multiple dimensions; or
a number of points in the radar point cloud.

5. The system of claim 1, the determining the occupant classification of the occupant including identifying a class of the occupant from among a plurality of classes.

6. The system of claim 5, the plurality of classes including multiple classes corresponding to different respective percentile ranges of human size.

7. The system of claim 5, the plurality of classes including at least one child class.

8. The system of claim 5, the plurality of classes including at least one pet class.

9. A method, comprising:
accessing sensor data from one or more imaging radar sensors of a vehicle;
identifying, based on the sensor data, a radar point cloud corresponding to an occupant of the vehicle;
analyzing the radar point cloud to determine an occupant classification of the occupant, including determining coordinates of a center of the radar point cloud according to a reference coordinate system, and determining the occupant classification of the occupant based on the coordinates of the center of the radar point cloud;
determining to disable a passive restraint system in the vehicle based on the occupant classification determined by analyzing the radar point cloud; and
disable the passive restraint system.

10. The method of claim 9, comprising:
determining a height of the radar point cloud; and
determining the occupant classification of the occupant further based on the height of the radar point cloud.

11. The method of claim 9, comprising:
determining measurements of the radar point cloud in multiple dimensions; and
determining the occupant classification of the occupant further based on the measurements of the radar point cloud in the multiple dimensions.

12. The method of claim 9, comprising determining the occupant classification of the occupant based on the coordinates of the center of the radar point cloud according to the reference coordinate system and one or more of:
a height of the radar point cloud;
measurements of the radar point cloud in multiple dimensions;
a number of points in the radar point cloud; or
coordinates of a center of the radar point cloud according to a reference coordinate system.

13. The method of claim 9, the determining the occupant classification of the occupant including identifying a class of the occupant from among a plurality of classes.

14. The method of claim 13, the plurality of classes including multiple classes corresponding to different respective percentile ranges of human size.

15. The method of claim 13, the plurality of classes including at least one child class.

16. The method of claim 13, the plurality of classes including at least one pet class.

17. A system, comprising:
a computer having a processor and a memory, the memory storing instructions executable by the processor to:
access sensor data from one or more imaging radar sensors of a vehicle;
identify, based on the sensor data, a radar point cloud corresponding to an occupant of the vehicle;
analyze the radar point cloud to determine an occupant classification of the occupant, including determining a number of points in the radar point cloud, and determining the occupant classification of the occupant based on the number of points in the radar point cloud;
determine to disable a passive restraint system in the vehicle based on the occupant classification determined by analyzing the radar point cloud; and
disable the passive restraint system.

18. The system of claim 17, the memory storing instructions executable by the processor to determine the occupant classification of the occupant based on the coordinates of the center of the radar point cloud according to the reference coordinate system and one or more of:
a height of the radar point cloud;
measurements of the radar point cloud in multiple dimensions; or
a number of points in the radar point cloud.

19. The system of claim 17, the determining the occupant classification of the occupant including identifying a class of the occupant from among a plurality of classes.

20. The system of claim 19, the plurality of classes including at least one of:
multiple classes corresponding to different respective percentile ranges of human size,
at least one child class; or
at least one pet class.

* * * * *